United States Patent [19]

Plummer et al.

[11] 4,354,305

[45] Oct. 19, 1982

[54] CONTOURING AND THREADING ATTACHMENT FOR MULTI-FUNCTION MACHINE TOOLS

[75] Inventors: Harvey R. Plummer, Fond du Lac; William E. Keller, Fox Point, both of Wis.

[73] Assignee: Giddings & Lewis, Inc., Fond du Lac, Wis.

[21] Appl. No.: 94,545

[22] Filed: Nov. 15, 1979

Related U.S. Application Data

[63] Continuation-in-part of Ser. No. 971,716, Dec. 21, 1978, abandoned.

[51] Int. Cl.³ .......................... B23B 3/26; B23Q 3/157
[52] U.S. Cl. ........................................ 29/568; 82/1.4; 82/2 E; 408/158
[58] Field of Search .................. 29/568; 82/2 A, 2 E, 82/1.4; 408/158, 152, 153, 154, 157; 279/97

[56] References Cited

U.S. PATENT DOCUMENTS

| | | | |
|---|---|---|---|
| 2,157,248 | 5/1939 | Swanson | 82/1.4 |
| 2,404,433 | 7/1946 | Christman | 82/1.4 |
| 2,430,026 | 11/1947 | Mealey | 74/840 |
| 2,495,583 | 1/1950 | Heron | 82/1.5 |
| 2,739,495 | 3/1956 | Johnson | 82/16 |
| 2,775,147 | 12/1956 | Schneebeli et al. | 82/1.5 |
| 2,781,199 | 2/1957 | Veldhuizen | 279/97 X |
| 2,885,231 | 5/1959 | Smith | 279/97 X |
| 2,945,401 | 7/1960 | Howey et al. | 173/43 |
| 3,113,475 | 12/1963 | Lombardo | 408/152 X |
| 3,135,980 | 6/1964 | Swanson et al. | 408/137 |
| 3,169,416 | 2/1965 | Carlson et al. | 408/1 R |
| 3,228,265 | 1/1966 | Stoddard et al. | 408/158 |
| 3,311,003 | 3/1967 | Daugherty | 82/2 E |
| 3,592,553 | 7/1971 | Heizer | 408/158 X |
| 3,686,964 | 8/1972 | Thibaut et al. | 82/1.4 |
| 3,902,386 | 9/1975 | Dressler et al. | 82/1.4 |
| 4,066,380 | 1/1978 | Beck et al. | 408/125 |
| 4,175,894 | 11/1979 | Skrentner | 408/1 R |
| 4,184,391 | 1/1980 | Eckle | 82/2 E X |
| 4,197,040 | 4/1980 | Wawrzyniak | 82/2 E X |
| 4,250,775 | 2/1981 | Jerue et al. | 82/1 C |

FOREIGN PATENT DOCUMENTS

2405694 8/1975 Fed. Rep. of Germany.
526073 9/1940 United Kingdom.
309576 6/1976 U.S.S.R.

*Primary Examiner*—Z. R. Bilinsky
*Attorney, Agent, or Firm*—Leydig, Voit, Osann, Mayer & Holt, Ltd.

[57] ABSTRACT

A contouring and threading attachment for use with numerically controlled multi-function machine tools having automatic tool changing capability. The attachment has a spindle-actuated body adapted to detachably engage an adapter collar rigidly fixed to the outer end of the spindle sleeve. The body may be installed and removed by the automatic exchange arm mechanism of the machine tool and be stored in the tool magazine when not in use. A cutting tool on the outboard end of the attachment is movably radially of the spindle axis. The radial movements of the cutting tool are executed automatically through corresponding axial movements of the spindle under the numerical control of the machine tool.

7 Claims, 15 Drawing Figures

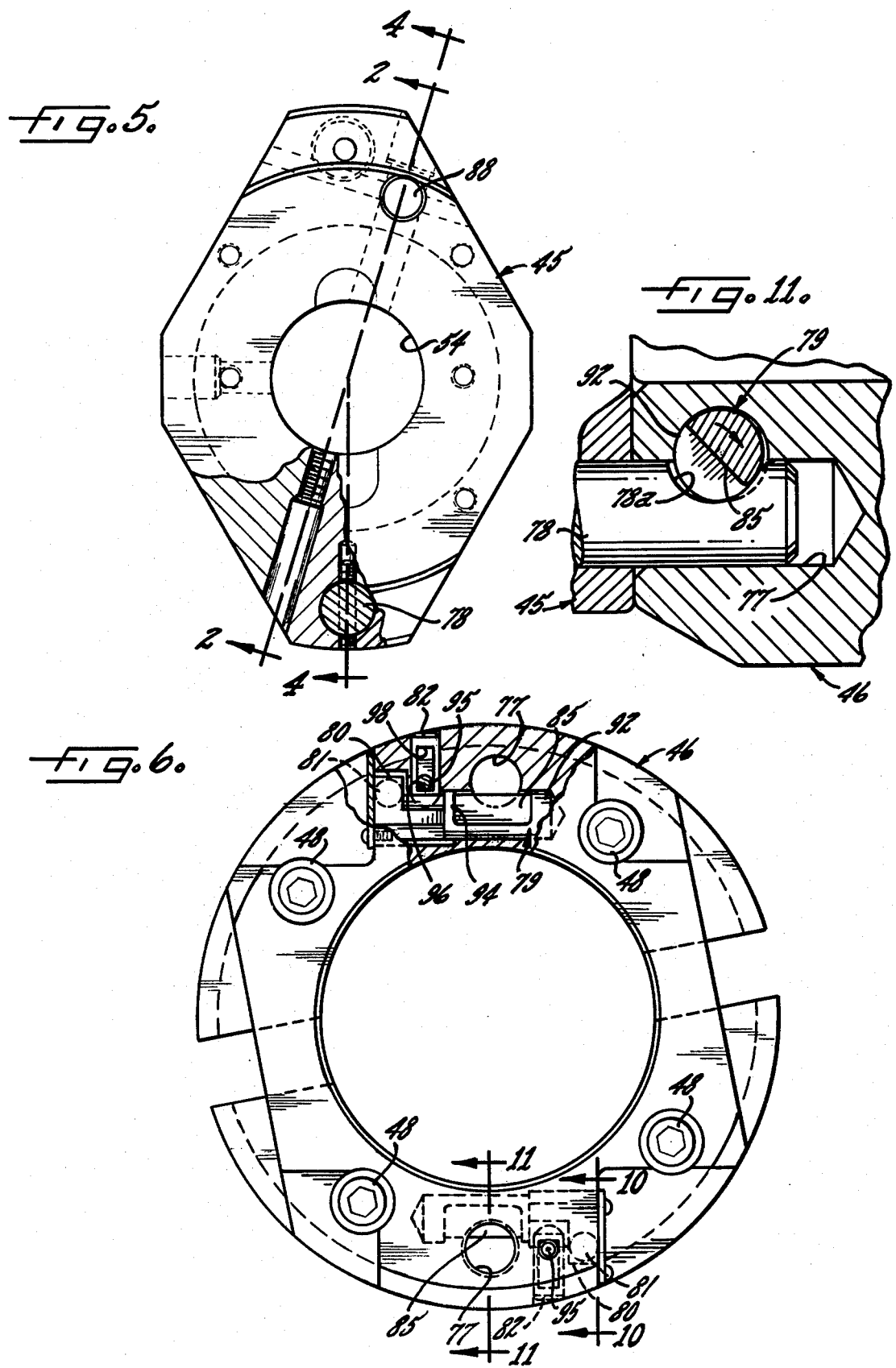

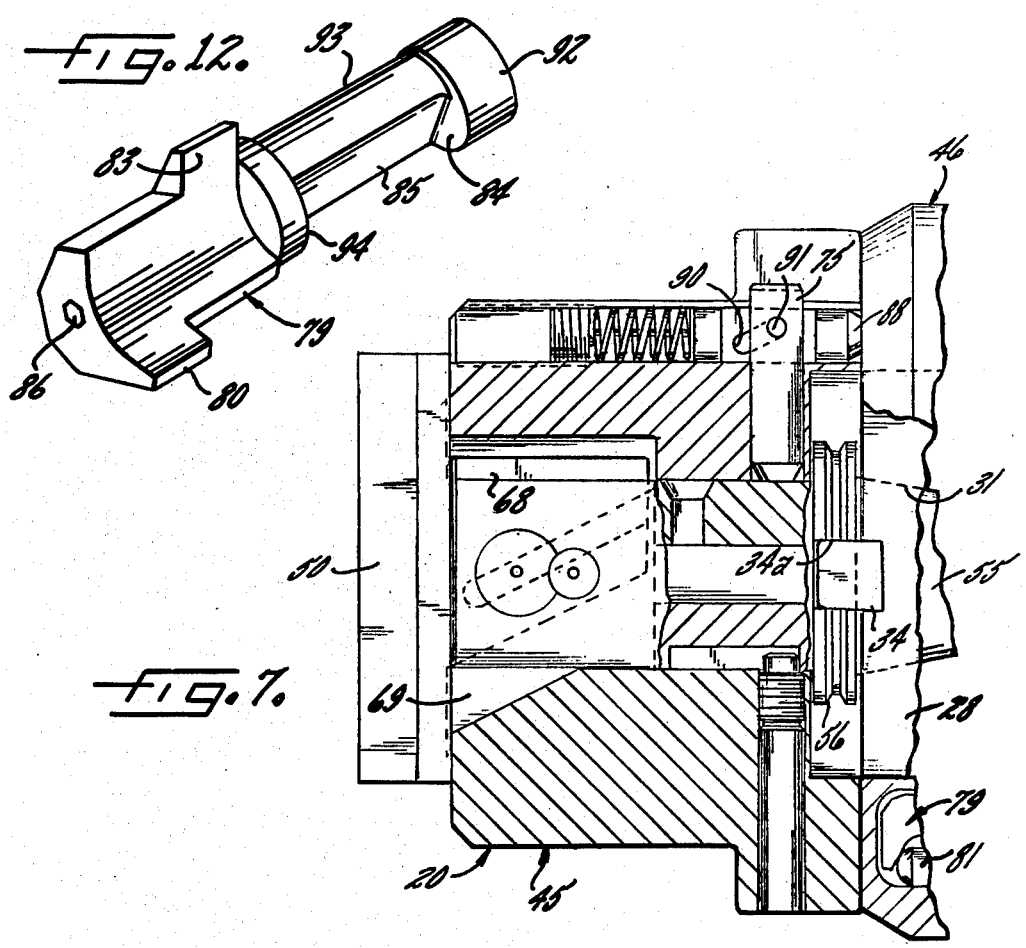
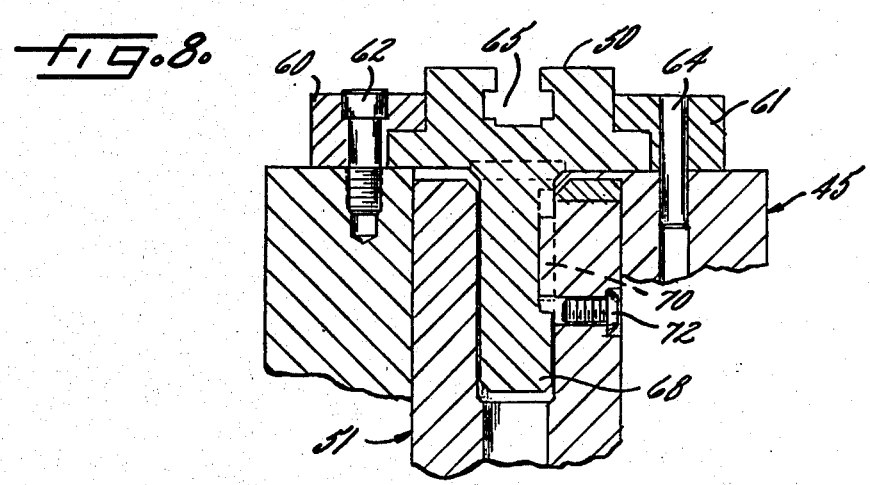

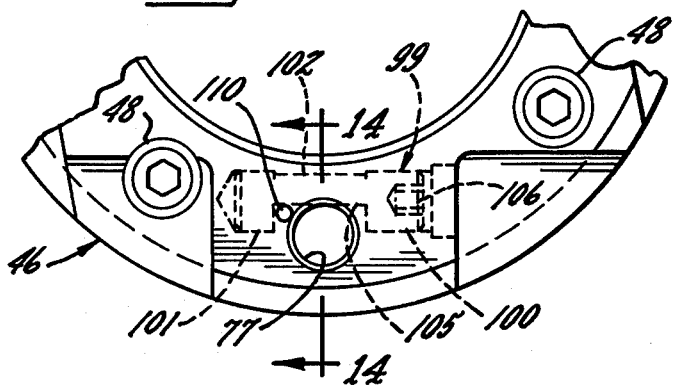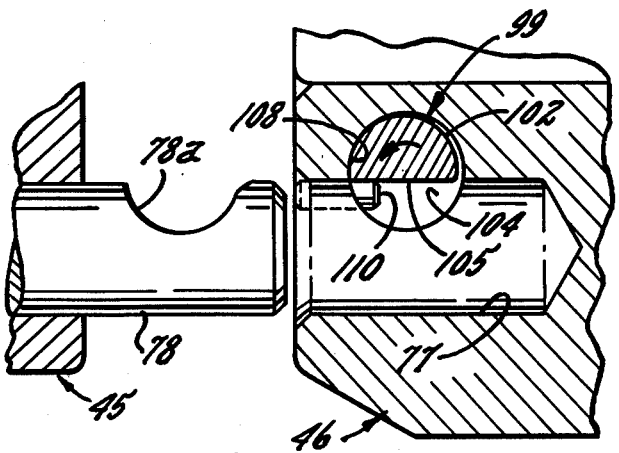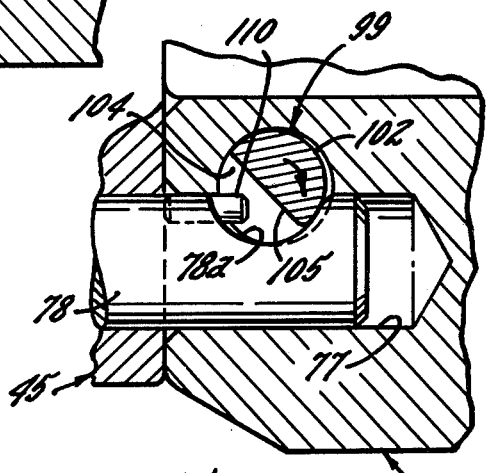

CONTOURING AND THREADING ATTACHMENT FOR MULTI-FUNCTION MACHINE TOOLS

DESCRIPTION OF THE INVENTION

This application is a continuation-in-part of our co-pending application Ser. No. 971,716, filed Dec. 21, 1978, now abandoned.

The present invention relates to a contouring and threading attachment for use with numerically controlled multi-function machine tools. The attachment finds particular, but not exclusive utility, when used with a numerically controlled multi-function machine tool having automatic tool changing capability and known as a machining center.

A large variety of machine tool attachments for boring, threading, and contouring which are actuated by relative axial motion of a spindle or shaft have been known heretofore. Attachments of this type are shown, for example, in the following U.S. and foreign patents, and in the following publications:

| Pat. No. | Patentee | Pat. No. | Patentee |
|---|---|---|---|
| 2,157,248 | Swanson | 3,228,265 | Stoddard et al. |
| 2,404,433 | Christman | 3,592,553 | Heizer |
| 2,430,026 | Mealey | 3,686,964 | Thibaut et al. |
| 2,495,583 | Heron | 3,902,386 | Dressler et al. |
| 2,775,147 | Schneebeli et al. | USSR 309,576 | |
| 3,113,475 | Lombardo | W. Ger. 2,405,694 | |

Publications

The American Machinist, June 1978, "DeVlieg Programmed Tool Contours a Bore"
DeVlieg Brochure on New DeVlieg NC/TP Head, September, 1978

Other attachments utilizing external templates or cams and relative axial motion to adjust the tool are shown in the following U.S. and British patents:

| | Pat. No. | Patentee |
|---|---|---|
| | 2,739,495 | Johnson |
| | 3,135,980 | Swanson et al. |
| British | 526,073 | Mayer and Schmidt |

Still other such attachments utilize relative rotary motion of a spindle or shaft to adjust the tool, as illustrated by the following U.S. patents:

| Pat. No. | Patentee |
|---|---|
| 2,945,401 | Howey et al. |
| 3,169,416 | Carlson et al. |
| 4,066,380 | Beck et al. |

These devices are for the most part rather complex. Many of them must be manually bolted in place over the machine tool spindle, while others require a highly specialized spindle, precluding other machining operations until after laborious removal of the attachment, if such be possible even then. None of such devices known to applicants are adapted for use with the automatic tool changer of a current commercial machining center. While the facing head attachment disclosed in Daugherty U.S. Pat. No. 3,311,003, issued Mar. 28, 1967, includes provision for handling by an automatic tool changer mechanism, the Daugherty device is not actuated by axial movement of the spindle but is rigidly fixed to the spindle and bodily movable therewith. It requires, moreover, a specially modified spindle and a separate actuating drive.

With the foregoing in mind, the general aim of the present invention is to provide a spindle motion actuated contouring and threading attachment for use in a numerically controlled machining center and having a body adapted to detachably engage an adapter collar rigidly fixed to the outer end of the spindle sleeve, said body being susceptible of being installed on the collar and removed therefrom by the tool exchange arm of the automatic tool changer mechanism on the machine.

Another object of the invention is to provide a contouring and threading attachment of the foregoing type having a spindle-actuated body which will lend itself to being stored, when not in use, in the tool storage magazine of the machining center.

A further object of the invention is to provide an attachment of the above type wherein the radial movements of the cutting tool are automatically executed through corresponding axial movements of the spindle under the numerical control of the machine tool.

Another object of the invention is to provide an attachment of the foregoing type capable of generating threads and contours with the high degree of precision normally obtained from other tooling in a current commercial machining center.

Still another object of the invention is to provide an attachment of the character set forth above which will be of compact size and relatively economical construction.

Other objects and advantages of the invention will become apparent from the following detailed description, taken in connection with the accompanying drawings, wherein:

FIG. 5 is a transverse view through the attachment, partially in elevation and partially in section, taken in the plane of the line 5—5 in FIG. 2.

FIG. 6 is a front elevational view of the adapter of said attachment, taken in the plane of the line 6—6 in FIG. 4 with a portion shown in transverse section to illustrate details of one of the automatic latching cam members therein.

FIG. 7 is an axial sectional view through a portion of the attachment shown in FIG. 2 but with the spindle and inner bar member in an outward position.

FIG. 8 is a fragmentary sectional view through the tool slide and guideway portion of the attachment, taken in the plane of the line 8—8 in FIG. 4.

FIG. 9 is a fragmentary sectional view taken through the upper portion of attachment body in the plane of the line 2—2 in FIG. 5.

FIG. 10 is an enlarged fragmentary sectional view taken substantially through the adapter in the plane of the line 10—10 in FIG. 6, detailing the resilient loading and stop devices associated with the automatic latching cams.

FIG. 11 is an enlarged fragmentary transverse view through the adapter, taken in the plane of the line 11—11 in FIG. 6 and showing a transverse section through one of the automatic latching cams.

FIG. 12 is a perspective view of one of the automatic cam members for releasably latching the attachment body to the adapter collar on the spindle sleeve.

FIG. 13 is a fragmentary front elevational view of the adapter, partially in section, depicting a modified form of latching cam adapted for manual rather than automatic actuation.

FIGS. 14 and 15 are fragmentary sectional views taken through the adapter in the plane of the line 14—14 and showing the manual latching cam in the unlocked and locked positions, respectively.

Figure 1:
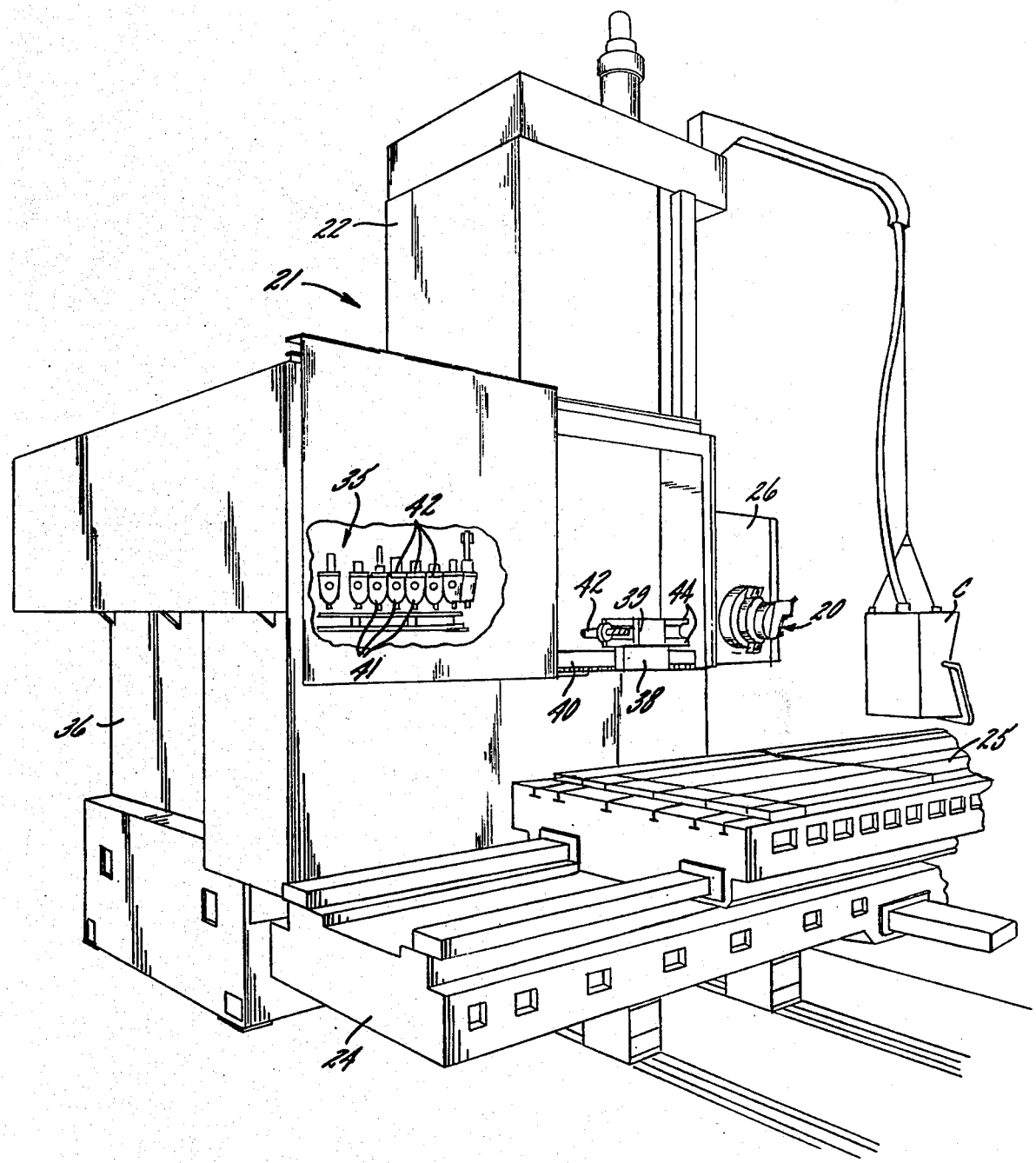
FIG. 1 is a perspective view of an illustrative multi-function machine tool with automatic tool changer including a contouring and threading attachment exemplifying the present invention.

While the invention is susceptible of various modifications and alternative constructions, a certain illustrative embodiment has been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

Referring more specifically to FIGS. 1-4, the invention is there exemplified in an illustrative contouring and threading attachment 20 operatively associated with a horizontal spindle machining center 21. The latter is a multi-function machine tool adapted to perform boring, drilling, milling, tapping and automatic tool changing operations, all under numerical control. Such a machining center is disclosed, for example, in William D. Zettler et al. U.S. patent application Ser. No. 721,096, filed Sept. 7, 1976, now U.S. Pat. No. 4,141,134, issued Feb. 27, 1979.

The machining center 21 in this case comprises a heavy upstanding column 22, a saddle 24 translatably mounted on bed ways in front of the column, and a table 25 translatably mounted on saddle ways situated on top of the saddle, the table extending transversely of the bed ways. A headstock 26 is mounted on ways for vertical sliding movement on the right hand side of the column (as viewed in FIG. 1). The operator's station, as indicated by the control pendant C, is situated to the right of the headstock (as viewed in FIG. 1).

Figure 2:
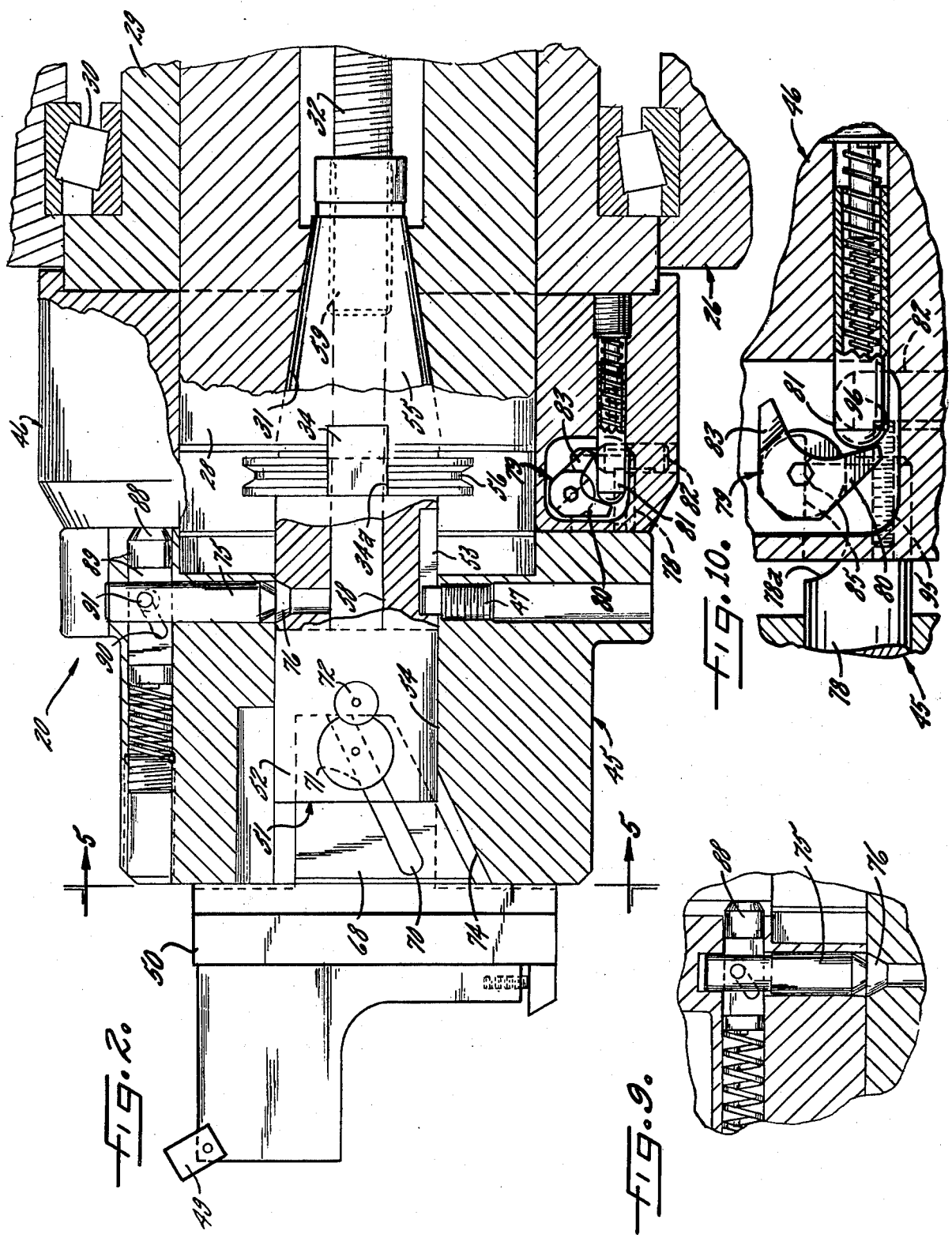
FIG. 2 is an axial sectional view taken through said attachment and the adjacent portion of the machine tool spindle in the plane of the line 2—2 in FIG. 5.
Figure 3:
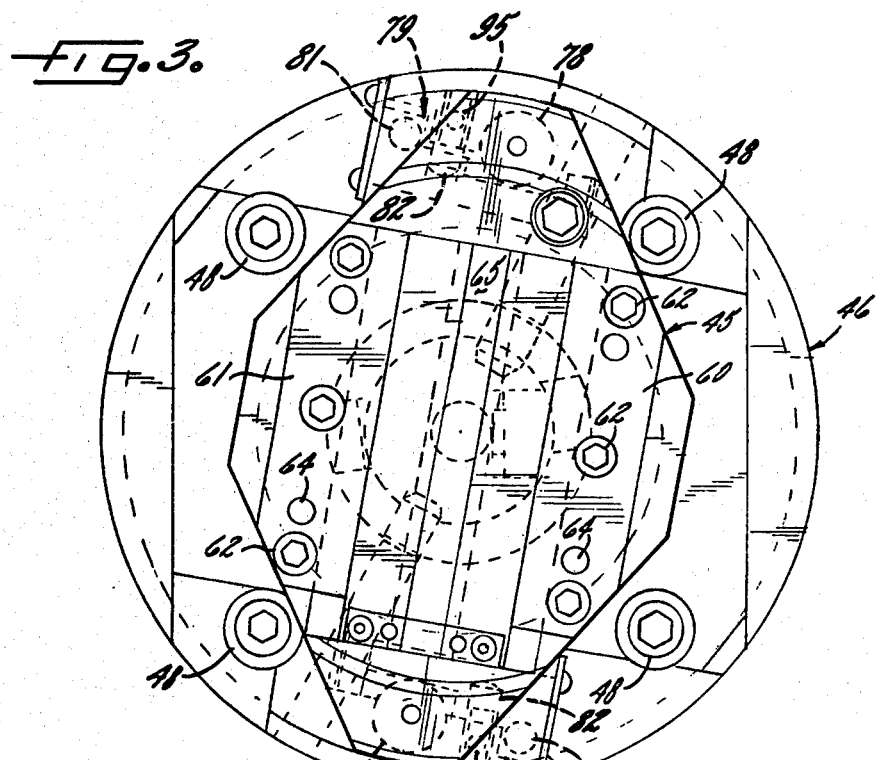
FIG. 3 is a front elevational view of the attachment as shown in FIG. 4, with the toolholder and cutting tool omitted to simplify illustration.

The headstock 26 carries an axially extensible, or live, spindle 28 slidably mounted in a spindle sleeve 29 (FIG. 2). The spindle sleeve is journaled in appropriate bearings 30 in the headstock and rotatably driven via a conventional gear transmission and servo drive (not shown). The spindle 28 is slidably keyed or splined within the spindle sleeve 29 for rotation in unison with the latter. The spindle may be extended or retracted with respect to the spindle sleeve by means of a ram mechanism mounted in the headstock (not shown). The outer end portion of the spindle is formed with a tapered socket 31 for receiving the correspondingly tapered shank of a flanged toolholder and also includes a power drawbolt 32 for engaging the inner end portion of the toolholder (FIG. 2). The outer end portion of the spindle includes one or a pair of drive keys 34 for drivingly engaging corresponding keyways in the toolholder flange. One keyway is preferably shallower than the other in order to maintain the angular orientation of the toolholder with respect to the spindle.

The automatic tool changer (FIG. 1) comprises, in general, a tool storage mechanism 35 located in spaced relation with the machine 21 on an independent ground supported base 36, a reciprocating shuttle 38 carrying a two handed rotary exchange arm 39, and a shuttle track 40 extending between the magazine 35 and the front face of the column 22. The magazine has a plurality of vertical socket members 41 for releasably holding a variety of tools 42 for the operations of the machining center 21. Each tool 42, actually a toolholder, has a tapered shank with a threaded bore at its smaller end for engaging the power drawbolt 32, and a grooved flange at its larger end for engagement by the peripheral gripping fingers 44 of the exchange arm 39. The shuttle 38 is adapted to transport the arm 39, and tools 42 held therein, between the magazine and the spindle 28. In this instance, the shuttle 38 is constructed so as to effect pivotal and extensible movements of the prior support for the exchange arm 39. This permits orientation of the arm 39 in a horizontal plane for removing a tool from, or returning a tool to, a magazine socket 41. It also permits orientation of the arm 39 in a vertical plane for removing a tool from, or inserting a tool into, the machine spindle 28.

Figure 4:
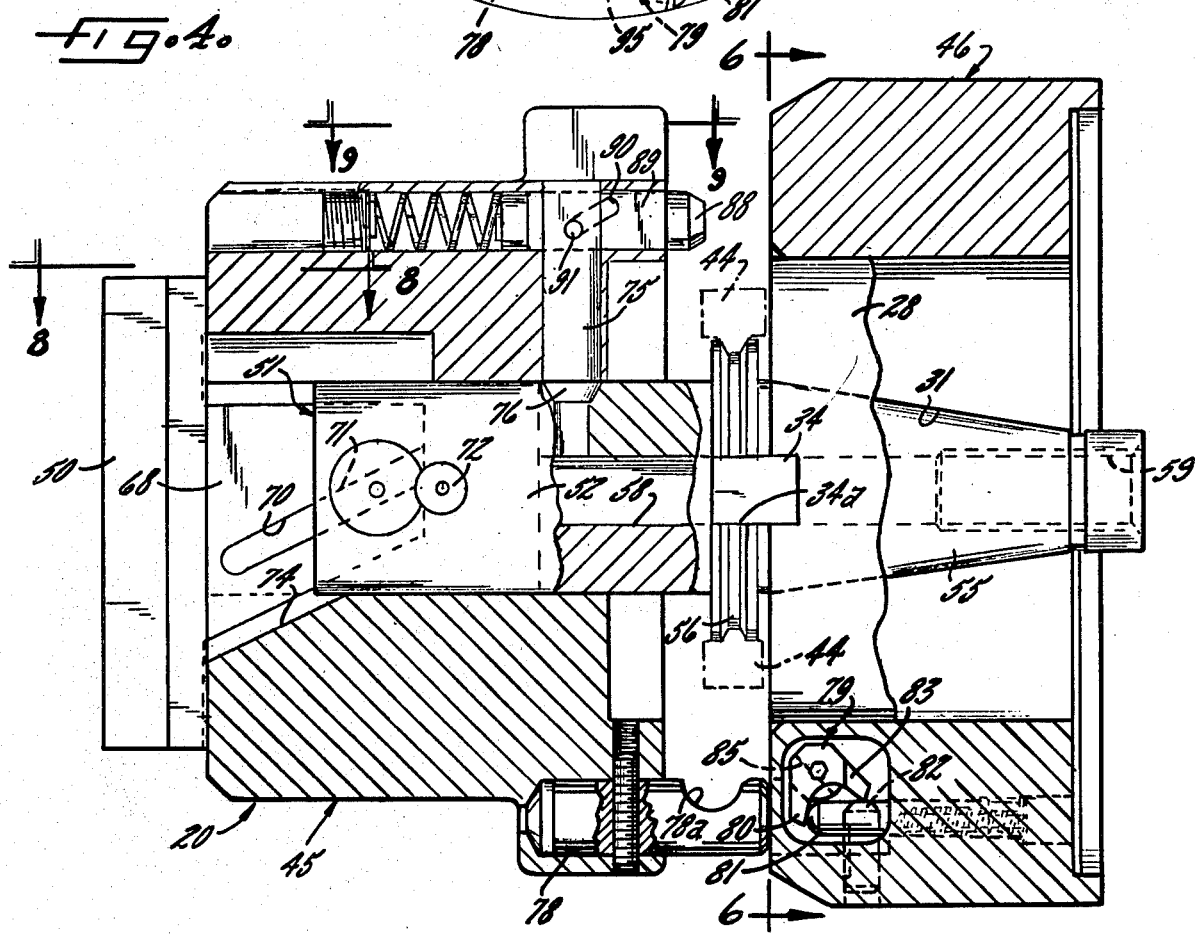
FIG. 4 is an axial sectional view through the attachment similar to FIG. 2 but with the attachment body in position for installation or removal by the automatic tool changer, taken in the plane of the line 4—4 in FIG. 5.

The attachment 20 comprises a body 45 which is adapted to detachably engage an adapter collar 46, the latter being rigidly fixed as by bolts 48 to the outer end of the spindle sleeve 29. The body has a radial cutting tool 49 and tool slide 50 adjustably mounted on its outboard end (FIGS. 2, 4, and 7). Telescopically mounted within the body 45 and adapter collar 46 is an actuating bar 51. The bar 51 is retained captive for limited axial movement within the body as by stop screw 47 which engages keyway 53 in the bar 51. The latter has a cylindrical outer end portion 52 which slidably engages a large axial bore 54 in the body. The actuating bar 51 has an inner end portion formed with a tapered shank 55 and an intermediate portion formed with a peripheral gripping flange 56. The shank 55 and flange 56 are of identical size and shape to the shank and flange of the machining center tools 42. In like manner, the actuating bar shank includes a central bore 58 having threads 59 engageable with the threaded end of the power drawbolt in the spindle. The shank 55 of the actuating bar is adapted to fit telescopically into the tapered socket 31 of the spindle with the spindle key 34 engaging keyway 34A formed in the gripping flange 56. The power drawbolt 32 retains the shank 55 in positive driving engagement with the spindle.

The cutting tool slide 50 (FIGS. 2-4, 7, 8) is mounted on the outer end face of the attachment body 45 for radial movement perpendicular to the plane of the spindle axis. The slide 50 is formed with a pair of shoulders which slidably engage guide bars 60, 61 fixed to the outboard face of the attachment body 45 as by cap screws 62 and dowels 64. It has a longitudinal slot 65 in which the single point cutting tool 49 may be clamped in any suitable manner. The slide 50 is connected to the actuating bar 51 by means of a cam extension 68 which slidably fits into a central slot 69 in the outer end portion of the bar 51. The extension 68 has an inclined cam track 70 engaged by a key 71 which in this case is formed on a circular plug retained by cap screw 72. By reason of this arrangement, it will be appreciated that axial movement of the actuator bar 51 will produce a corresponding radial movement of the tool slide 50 and its cutting tool 49. Clearance around the cam extension 68 to permit such movement is afforded by the axial slot 74 in the body.

Provision is made for releasably latching the actuating bar 51 in a fixed position with respect to the attachment body 45 to facilitate storage of the attachment in the tool magazine 35 and transfer to the spindle by the gripping fingers 44 of the tool exchange arm 32. This is accomplished by means of a detent actuated shot pin 75 adapted to engage a tapered recess 76 in the intermediate portion of the actuating bar (FIGS. 2, 4 and 7) when the attachment body is disengaged from the adapter collar 46. During storage of the body 45 in the magazine, and also during transfer of the body between the magazine and the spindle by the exchange arm, as indicated in FIG. 4, the shot pin 75 is engaged in the recess 76, locking the actuating bar 51 against axial movement. This serves to maintain appropriate clearance between the body 45 and adjacent tool storage sockets in the magazine. It also serves to maintain sufficient clearance between the body 45 and the adapter collar 46 to allow the tool changer gripper fingers 44 to load the attachment into the spindle without interference. By reason of this arrangement, it will be appreciated that the shot pin 75 becomes disengaged from the recess 76 and unlocks the actuating bar 51 for axial movement when the attachment body 45 has been coupled to the attachment collar 46.

Provision is further made in the attachment 20 for enabling the body 45 to detachably engage and lock onto the adapter collar 46 for rotation in unison with the latter and with the spindle 28. This is accomplished by means of cooperating locking elements on both the body and the collar (FIGS. 2–6, 10, 12). In the present instance, therefore, the body has mounted thereon at diametrically opposed points a pair of stud cams 78 adapted to coact with a corresponding pair of automatic locking cams 79 housed within the adapter collar 46. Since both cam members in each pair are identical, a description of one cooperating set will suffice for both.

Accordingly, it will be noted that each stud cam 78 is formed as a pin fixed to the attachment body 45 in axial alignment with the axis of the actuating bar 51 but spaced radially therefrom. Each stud cam has an arcuate recess 78a formed transversely thereof on the side facing the actuating bar. The collar is formed with a bore 77 adapted to slidably receive the stud cam 78. The collar also has a transverse bore 108 which intersects the bore 77 but is partially offset therefrom. Mounted in the bore 108 of collar 46 for rotation on an axis transverse to that of the stud cam 78 is a cooperating automatic locking cam 79 adapted to engage the stud cam recess 78a.

Each automatic locking cam 79 (FIGS. 2, 4, 6 and 10–12) is journaled for rotary motion within an appropriate recess in the collar 46 and is formed at one end with oppositely extending rocker arms 80, 83. Toward its other end, and adjacent the rocker arm 83, the locking cam 79 is formed with journals 92 and 94, respectively. A relatively large central recess 84 in the intermediate portion 93 of the cam 79 between the journals 92, 94 defines an abutment area 85. In this case, the area 85 happens to be situated in the vicinity of a diametral plane passing through the rotational axis of the cam. The intermediate portion 93 of the cam 79 is segmental in shape and, as indicated in FIG. 11, has a cross section of progressively increasing radius with respect to the longitudinal axis of the cam. This gives the outer peripheral surface of the segmental portion 93 a slightly spiral configuration about such longitudinal axis which facilitates tight engagement with the stud cam recess 78a.

The cam 79, as viewed in FIGS. 2, 4 and 10, is biased in a clockwise direction as by means of resiliently loaded detent 81 which engages the rocker arm 80. The detent 81, acting on the rocker arm 80, resiliently biases the cam 79 so that its abutment area 85 is normally oriented in a plane skewed at an angle which may, for example, be on the order of 45° with respect to the longitudinal axis of the cooperating stud cam 78. This angle is not critical and may, for example, vary from 30° to 90° with respect to the stud cam longitudinal axis.

For the purpose of limiting the arcuate motion of each automatic locking cam 79, and also to provide a means for releasing it from engagement with its associated stud cam 78, a cam plunger 82 is slidably mounted in the adapter collar 46 (FIGS. 4, 6, 10) adjacent each locking cam. The cam plunger 82 is situated in close proximity to the detent 81 but disposed substantially normal to the axis of the latter and in cooperating engagement with the rocker arm 83 of the latching arm 79. A relieved area on the side of the cam plunger 82 defines a pair of axially spaced stop shoulders 96, 98 which are engageable alternately by a stop in the form of a pin 95 fixed to the collar 46. The end portion of the pin 95 projects into the bore housing the plunger 82 and thereby maintains the latter captive for limited axial travel in the bore. The plunger 82, in turn, limits the arcuate motion of the latching cam 79.

In operation of the locking members, assuming that the shank 55 of the actuating bar 51 has been inserted in the spindle 28 and the drawbolt engaged therewith, and the gripper fingers 44 have been withdrawn, the spindle moves to the right as shown in FIG. 4. Such spindle motion may be on the order of $1\frac{3}{8}''$ total. This causes each stud cam 78 to enter its cooperating bore 77 in the collar 46 and to accost the skewed abutment area 85 of the associated automatic locking cam 79, rotating the same counterclockwise from the position shown in FIGS. 2 and 4 to the position shown in FIG. 10 so that the enlarged end of the stud cam passes the longitudinal axis of the locking cam. Continued spindle motion brings the face of the attachment body 45 against the outer face of the adapter collar 46. This also brings each stud cam into position where its recess 78a registers with the outer periphery of the segmental portion 93 of locking cam 79 and the latter has been rotated clockwise toward its original position by the biasing detent 81. Due to the spiral or eccentric configuration of the outer peripheral surface of the cam portion 93, the latter engages the stud cam recess 78a with a wedging action which tensions the stud cam and securely holds the body 45 in tight abutting relation with the collar 46.

The automatic locking cam 79 may be rotated in a counterclockwise direction (as viewed in FIG. 10) against the bias of detent 81 to disengage the stud cam recess 78a by power means, as, for example, a small air or hydraulic cylinder or electrical solenoid acting on the end of the plunger 82 remote from the rocker arm 83. Such power means will cause the plunger 82 to move radially inward until the shoulder 98 abuts against the stop pin 95. By the same token, each of the automatic cams may be actuated manually for both engagement and disengagement as by means of a socket 86 (FIGS. 6, 11 and 12) in one end thereof engageable by an appropriate socket wrench (not shown). Manual actuation of each automatic locking cam 79 to disengage same from the stud cam recess 78a may also be accomplished by pressing an appropriate hand tool radially inward against the outer end of the associated cam plunger 82.

In order to free the actuating bar 51 to move axially with the spindle 28, the body 45 is provided with a detent pin 88 spaced outwardly from, but parallel with, the axis of the bar 51 (FIGS. 2, 4, 7 and 9). The pin 88 is formed with an intermediate flat portion 89 adapted to ride in a vertical slot in the upper portion of the shot pin 75. The flat portion 89 has an inclined cam slot 90 engaged by a transverse pin 91 fixed to the shot pin. The detent pin 88 is resiliently biased so as to project outwardly from the face of the body 45 in a direction toward the collar 46, as shown in FIG. 4. As the attachment body 45 moves toward the collar from the position shown in FIG. 4 to the position shown in FIG. 2, the detent pin 88 is accosted by the outer face of the collar 46 and moved to the left, as viewed in FIGS. 4 and 2. By the time the body has been brought into abutment with the outer face of the adapter collar, the inclined cam slot 90 has exerted an upward force on the shot pin 75, disengaging it completely from the recess 76 in the actuating bar 51. This leaves the bar 51 free to move in unison with the controlled axial movements of the spindle, resulting in corresponding radial movements of the tool slide and cutting tool 49.

With the foregoing in mind, it will be helpful at this point to present a brief synopsis of the operation of the attachment 20. At the outset, it will be assumed that the attachment body assembly 45, including the actuating bar and its tapered shank 55, has been transferred from the tool storage magazine 35 by the exchange arm 39 and that the latter has inserted the shank 55 into the tapered socket of the spindle, as shown in FIG. 4. The power drawbolt then engages the threaded inner end of the shank 55 and the exchange arm gripper fingers 44 withdraw. The spindle 28 is then retracted axially, causing the stud cams 78 to enter their bores 77 in the adapter collar. Continued retracting motion of the spindle brings the inner end portion of each stud cam 78 into contact with the intervening abutment area 85 of each automatic cam 79, rotating each cam 79 through approximately 45° in this instance to clear the end portion of the stud cam. With continued motion of the stud cam, the arcuate recess 78a is brought into registration with the arcuate periphery of the automatic cam 79. At this point, the resiliently loaded detents 81 rotate their respective automatic cams 79 through approximately 45° in the reverse direction, bringing the eccentric periphery of the segmental portion 93 of each automatic cam 79 into locking engagement with the arcuate recess 78a of its associated stud cam 78. With the parts in this condition, the attachment body is snugly coupled and locked to the adapter collar 46; the shot pin 75 has been lifted clear of the recess 76 in the actuating bar 51 leaving the bar 51 free to follow the axial movements of the spindle; and the attachment 20 is in operating condition as illustrated in FIG. 2, ready for rotation in unison with the spindle sleeve and spindle to perform a machining operation.

To adjust the tool 49 radially for a contouring or threading operation as the attachment rotates, the spindle moves axially outward or inward under the numerical control of the machining center 21. The inclined cam track 70 and key 71 convert the axial movements of the spindle and actuating bar 51 into radial movements of the tool 49. Axial feeding of a workpiece (not shown) with respect to the tool 49 may readily be accomplished by the saddle feed motion of the machining center 21.

Upon completion of a machining operation utilizing the attachment 20, the body and actuating bar may readily be removed and stored by the tool exchange arm 35 by reversing the sequence of steps described above. As an incident to disengagement of the body 45 from the adapter collar 46, the spring detent 88 moves outwardly, camming the slot pin 75 downwardly into engagement with the recess 76 and locking the actuating bar 51 against axial movement. The spindle 28 may then be utilized for other machining operations, it being only necessary for the programmer to take into account the axial length of the adapter collar 46.

Turning now to FIGS. 13-15, a modified form of locking cam 99 adapted for use in the attachment 20 is there shown. The cam 99 is similar to the automatic locking cam 79 but is designed to be engaged and disengaged manually with an associated stud cam recess 78a. Referring more specifically to FIG. 13, it will be noted that the manual locking cam 99 comprises end journals 100, 101 separated by a segmental intermediate portion 102. A large recess 104 in the portion 102 defines an abutment area 105 adjacent the longitudinal axis of the cam 99. At one end, the cam 99 is formed with a socket 106 engageable by an actuating socket wrench (not shown).

Each locking cam 99 is journaled within a transverse bore 108 in the collar 46 and which intersects longitudinal bore 77 also formed in the collar 46. The longitudinal bore is adapted to receive the associated stud cam 78 when the body 45 is being attached to the collar 46. The locking cam 99 is movable manually by means of a socket wrench between a disengaged position, shown in FIG. 14, and an engaged position, shown in FIG. 15. The disengaged position is defined by a stop pin 110 fixed to the adapter collar 46. The engaged position is defined by the coaction of the spiral or eccentric surface on the segmental portion 102 and the arcuate recess 78a of the associated stud cam 78. This will normally be a position somewhat short of the maximum angular position in the clockwise direction, as viewed in FIGS. 14 and 15, determined by the stop pin 110.

In operation, each locking cam 99 is manually placed in its disengaged position; the body 45 is moved toward the adapter collar 46; and each stud cam enters its associated bore 77 in the collar. Upon abutment of the opposed faces of the body 45 and collar 46, the stud cam recess 78a is brought into register with the outer periphery of the segmental portion 102 of the cam 99. The cam 99 is then manually rotated in a clockwise direction as viewed in FIGS. 14 and 15, wedging the spiral or eccentric surface of the cam portion 102 into tight engagement with the stud cam recess 78a. This tensions the stud cam and maintains the body 45 and collar 46 in tight abutting relation. Disengagement of each locking cam is effected manually by reversing the foregoing steps.

We claim as our invention:

1. A contouring and threading attachment for use with a numerically controlled multi-function machine tool having an automatic tool changer including a tool exchange arm with a tool gripper, said machine tool also having a spindle sleeve and a spindle mounted therein for rotation bodily therewith and for axial movement with respect thereto, said spindle having a tool engaging socket therein, said attachment comprising, in combination:
(a) an adapter collar mountable rigidly on the spindle sleeve of said machine tool for rotation bodily therewith;
(b) a body having a central axial bore therein and adapted to detachably engage said adapter collar for rotation in unison therewith;
(c) an actuating bar housed telescopically within said central bore of said body and movable axially of said bore;
(d) said actuating bar having an inner end portion, an intermediate portion, and an outer end portion;
(e) said inner end portion of said actuating bar being insertable in the spindle socket for driving connection therewith rotationally and axially;
(f) a transverse flange on said intermediate portion of said actuating bar engageable by the gripper of the tool exchange arm acting between said body and said adapter collar;
(g) a radial tool slide adjustably mounted on the outboard end of said body; and
(h) means defining a motion transmitting connection between said tool slide and said outer end portion of said actuating bar;
(i) means for releasably latching said actuating bar in a fixed position with respect to said attachment body to facilitate storage and transfer of said attachment to and from the spindle by the tool exchange arm; and
(j) detent means for disengaging said releasable latching means upon engagement of said body with said adapter collar, and for engaging said releasable latching means upon disengagement of said body from said adapter collar.

2. A contouring and threading attachment for use with a mechanically controlled multi-function machine tool having an automatic tool changer including a tool exchange arm with a tool gripper, said machine tool also having a spindle sleeve and a spindle mounted therein for rotation bodily therewith and for axial movement with respect thereto, said spindle having a tool engaging socket therein, said attachment comprising, in combination:
(a) an adapter collar mountable rigidly on the spindle sleeve of said machine tool for rotation bodily therewith;
(b) a body having a central axial bore therein and adapted to be detachably coupled to said adapter collar for rotation in unison therewith;
(c) an actuating bar housed telescopically within said central bore of said body and movable axially of said bore;
(d) said actuating bar having an inner end portion, an intermediate portion, and an outer end portion;
(e) said inner end portion of said actuating bar being insertable in the spindle socket for driving connection therewith rotationally and axially;
(f) means on said intermediate portion of said actuating bar engageable by the gripper of said tool exchange arm acting between said body and said adapter collar;
(g) a radial tool slide adjustably mounted on the outboard end of said body;
(h) means defining a motion transmitting connection between said tool slide and said outer end portion of said actuating bar;
(i) means for releasably latching said actuating bar in a fixed position with respect to said attachment body to facilitate storage and transfer of said attachment to and from the spindle by said tool exchange arm; and
(j) said releasable latching means further comprising a detent pin and cooperating shot pin, the latter being interposed between said body and said actuating bar.

3. A contouring and threading attachment as defined in claim 2, wherein said releasable latching means operates to disengage said shot pin from said actuating bar as an incident to coupling of said body to said adapter collar, and wherein said releasable latching means operates to engage said shot pin with said actuating bar as an incident to uncoupling said body from said adapter collar.

4. A contouring and threading attachment as defined in claim 2, wherein a cam connection is interposed between said detent pin and said shot pin and is adapted to effect withdrawal of said shot pin from said actuating bar upon compression of said detent pin through contact with said adapter collar.

5. A contouring and threading attachment for use with a numerically controlled multi-function machine tool having an automatic tool changer including a tool exchange arm with a tool gripper, said machine tool also having a spindle sleeve and a spindle mounted therein for rotation bodily therewith and for axial movement with respect thereto, said spindle having a tool engaging socket therein, said attachment comprising, in combination:
(a) an adapter collar mountable rigidly on the spindle sleeve of said machine tool for rotation bodily therewith;
(b) a body having a central axial bore therein and adapted to detachably engage said adapter collar for rotation in unison therewith;
(c) locking means interposed between said body and said adapter collar for detachably coupling same together when said body is in abutting engagement with said adapter collar;
(d) said locking means comprising a stud cam fixed to said body and a resiliently biased automatic cam journaled in said adapter collar, said cam members being engageable as an incident to movement of said body into contact with said adapter collar;
(e) an actuating bar housed telescopically within said central bore of said body and movable axially of said bore;
(f) said actuating bar having an inner end portion, an intermediate portion, and an outer end portion;
(g) said inner end portion of said actuating bar being insertable in the spindle socket for driving connection therewith rotationally and axially;
(h) means on said intermediate portion of said actuating bar engageable by the gripper of the tool exchange arm acting between said body and said adapter collar;
(i) a radial tool slide adjustably mounted on the outboard end of said body;
(j) means defining a motion transmitting connection between said tool slide and said outer end portion of said actuating bar;

(k) means for releasably latching said actuating bar in a fixed position with respect to said attachment body to facilitate storage and transfer of said attachment to and from the spindle by said tool exchange arm; and (l) said releasable latching means further comprising a detent pin and cooperating shot pin, the latter being interposed between said body and said actuating bar.

6. A contouring and threading attachment as defined in claim 5, wherein said automatic locking cam further comprises:

(a) a pair of axially spaced apart journals;

(b) a segmental portion interposed between said journals and having a planar area adjacent the diametral plane of said cam, and an arcuate outer peripheral surface;

(c) said arcuate outer peripheral surface having a radius increasing progressively from one lateral edge of said planar area toward the other lateral edge of said area defining an eccentric configuration for effecting tight engagement with an arcuate recess in said stud cam;

(d) a first rocker arm fixed to said locking cam adjacent one said journal and remote from said segmental portion;

(e) a second rocker arm fixed to said locking cam remote from said segmental portion and axially spaced from said first rocker arm;

(f) a resiliently loaded detent mounted in said body and disposed in agreement with one of said rocker arms for automatically engaging the locking cam with said arcuate stud cam recess upon registration therewith; and (g) a cam plunger mounted in said body and disposed in engagement with the other of said rocker arms for limiting the arcuate movement of said locking cam and for disengaging same from said stud cam recess.

7. A contouring and threading attachment as defined in claim 5, wherein said locking means comprises a pair of stud cams mounted at diametrically opposed points on said body and a cooperating pair of automatic cams mounted at diametrically opposed points on said adapter collar.

* * * * *

UNITED STATES PATENT AND TRADEMARK OFFICE
CERTIFICATE OF CORRECTION

PATENT NO. : 4,354,305

DATED : October 19, 1982

INVENTOR(S) : Harvey R. Plummer and William E. Keller

It is certified that error appears in the above—identified patent and that said Letters Patent is hereby corrected as shown below:

Abstract, line 10, change "movably" to -- movable --;

Column 5, line 11, change "32" to -- 39 --;

Column 6, line 26, delete "arm" (second occurrence) and substitute -- cam --;

Column 8, line 10, change "35" to -- 39 --;

Column 9, line 40, change "mechanically" to -- numerically --

Column 12, line 8, change "agreement" to -- engagement --.

Signed and Sealed this

Eighth Day of March 1983

[SEAL]

Attest:

GERALD J. MOSSINGHOFF

Attesting Officer    Commissioner of Patents and Trademarks